United States Patent
Noma

(10) Patent No.: US 8,270,355 B2
(45) Date of Patent: Sep. 18, 2012

(54) RADIO COMMUNICATION CONTROL DEVICE, RADIO COMMUNICATION CONTROL SYSTEM, RADIO COMMUNICATION CONTROL METHOD, RADIO COMMUNICATION CONTROL PROGRAM AND RECORDING MEDIUM

(75) Inventor: Satoshi Noma, Minato-ku (JP)

(73) Assignee: NEC Corporation, Tokyo (JP)

( * ) Notice: Subject to any disclaimer, the term of this patent is extended or adjusted under 35 U.S.C. 154(b) by 830 days.

(21) Appl. No.: 12/338,542

(22) Filed: Dec. 18, 2008

(65) Prior Publication Data

US 2009/0161619 A1    Jun. 25, 2009

(30) Foreign Application Priority Data

Dec. 20, 2007   (JP) ................. 2007-328466

(51) Int. Cl.
*H04W 4/00*   (2009.01)
(52) U.S. Cl. ........ 370/329; 370/331; 370/332; 370/334; 370/328; 370/341; 455/432.1; 455/447; 455/451; 455/452.2; 455/453; 455/454
(58) Field of Classification Search .................. None
See application file for complete search history.

(56) References Cited

U.S. PATENT DOCUMENTS

| | | | | |
|---|---|---|---|---|
| 5,960,367 | A * | 9/1999 | Kita | 455/567 |
| 6,047,188 | A * | 4/2000 | Noda et al. | 455/450 |
| 6,930,993 | B1 * | 8/2005 | Hamada et al. | 370/347 |
| 7,263,366 | B2 * | 8/2007 | Miyashita | 455/452.2 |
| 7,292,824 | B2 * | 11/2007 | Yamaguchi et al. | 455/63.1 |
| 7,412,243 | B2 * | 8/2008 | Okada | 455/450 |
| 2001/0033579 | A1 * | 10/2001 | Nelson et al. | 370/447 |
| 2002/0041584 | A1 * | 4/2002 | Sashihara | 370/337 |
| 2002/0061073 | A1 * | 5/2002 | Huang et al. | 375/295 |

(Continued)

FOREIGN PATENT DOCUMENTS

JP    2003-18091 A    1/2003

(Continued)

OTHER PUBLICATIONS

R1-073674, "Overload Indicator Handling for LTE" (3GPP), Nokia Siemens Networks, Nokia, Internet Source: <URL: http://www.3gpp.org/ftp/Specs/html-info/TDocExMtg--R1-50--26036.htm>, Aug. 20-24, 2007, p. 1-6.

(Continued)

*Primary Examiner* — Warner Wong
*Assistant Examiner* — Dung B Huynh
(74) *Attorney, Agent, or Firm* — Sughrue Mion, PLLC

(57) ABSTRACT

The present invention provides a radio communication control device, a radio communication control system, a radio communication control method, a radio communication control program and a recording medium, which control radio resource appropriately when an interference notification signal is received. The radio communication control device according to the present invention, which controls allocation of radio resource for use by a mobile communication terminal in a radio communication system, comprises: radio means for monitoring a communication status with the mobile communication terminal and detecting interference relating to first frequency information; transceiving means for transmitting a first interference notification signal containing the first frequency information and receiving a second interference notification signal containing second frequency information; and a control means for restricting the radio resource in a case when the second interference notification signal is being received, wherein the control means does not restrict the radio resource in a case when the first frequency information and the second frequency information have a predetermined relation.

5 Claims, 8 Drawing Sheets

U.S. PATENT DOCUMENTS

| | | | |
|---|---|---|---|
| 2003/0032430 A1* | 2/2003 | Lee | 455/436 |
| 2005/0032537 A1* | 2/2005 | Miyashita | 455/517 |
| 2005/0058117 A1* | 3/2005 | Morioka et al. | 370/346 |
| 2006/0209721 A1* | 9/2006 | Mese et al. | 370/254 |
| 2007/0104164 A1* | 5/2007 | Laroia et al. | 370/338 |
| 2007/0149129 A1* | 6/2007 | Das et al. | 455/67.11 |
| 2007/0191015 A1* | 8/2007 | Hwang et al. | 455/442 |
| 2007/0211686 A1* | 9/2007 | Belcea et al. | 370/345 |
| 2007/0253355 A1* | 11/2007 | Hande et al. | 370/328 |
| 2008/0070510 A1* | 3/2008 | Doppler et al. | 455/69 |
| 2008/0095102 A1* | 4/2008 | Meng et al. | 370/329 |
| 2008/0161009 A1* | 7/2008 | Zhao et al. | 455/452.2 |
| 2009/0005058 A1* | 1/2009 | Kazmi et al. | 455/452.1 |
| 2009/0016295 A1* | 1/2009 | Li et al. | 370/330 |
| 2009/0047971 A1* | 2/2009 | Fu | 455/450 |
| 2009/0109939 A1* | 4/2009 | Bhushan et al. | 370/337 |
| 2009/0186609 A1* | 7/2009 | Wu et al. | 455/424 |
| 2009/0196192 A1* | 8/2009 | Lim et al. | 370/252 |

FOREIGN PATENT DOCUMENTS

| | | |
|---|---|---|
| JP | 2004-159345 A | 6/2004 |
| JP | 2005-51523 A | 2/2005 |
| JP | 2005-65182 A | 3/2005 |
| WO | 2006/001137 A1 | 2/2006 |
| WO | 2006/070551 A1 | 7/2006 |

OTHER PUBLICATIONS

Japanese Office Action for JP2007-328466 dated Jun. 12, 2012.

* cited by examiner

F I G. 1
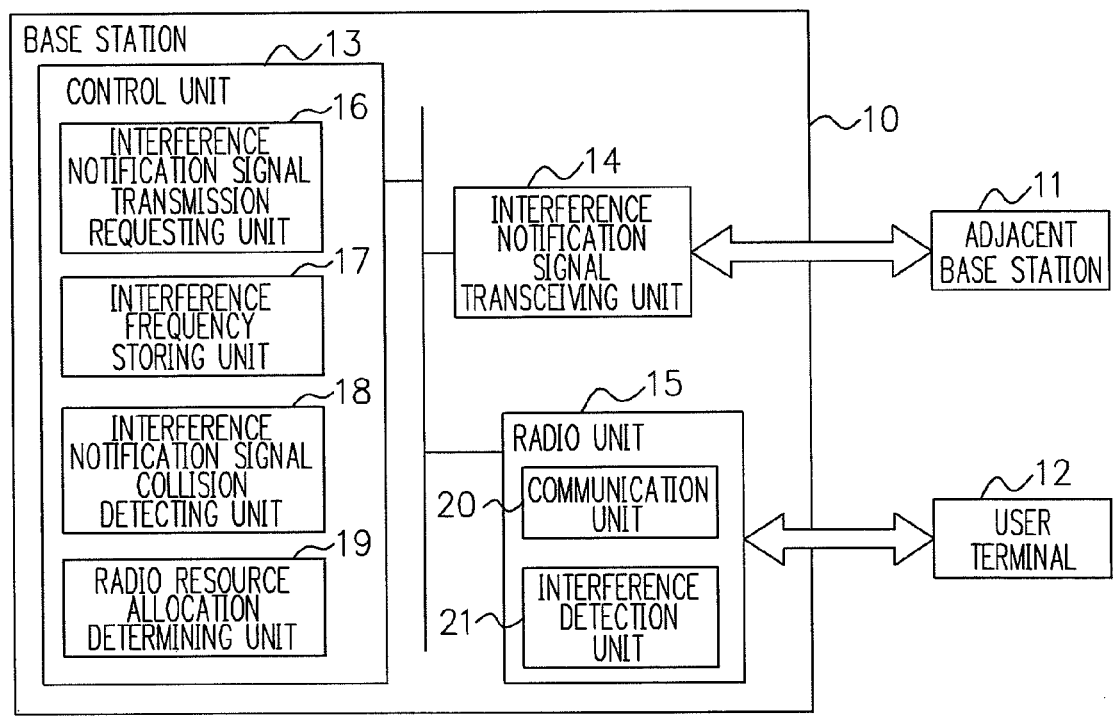
F I G. 2
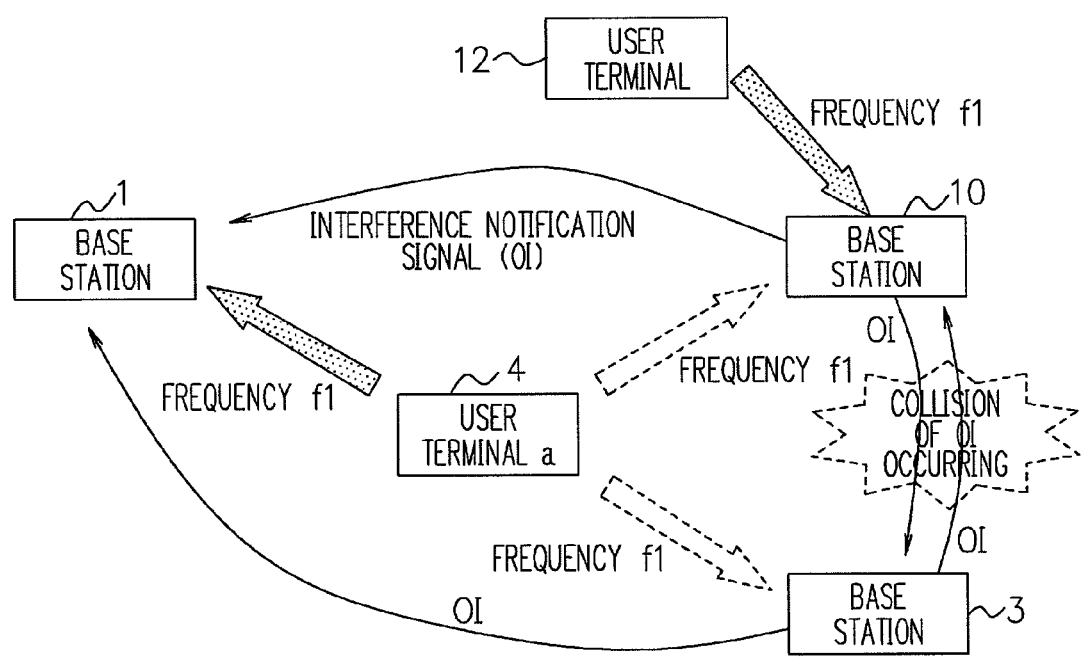

F I G. 5
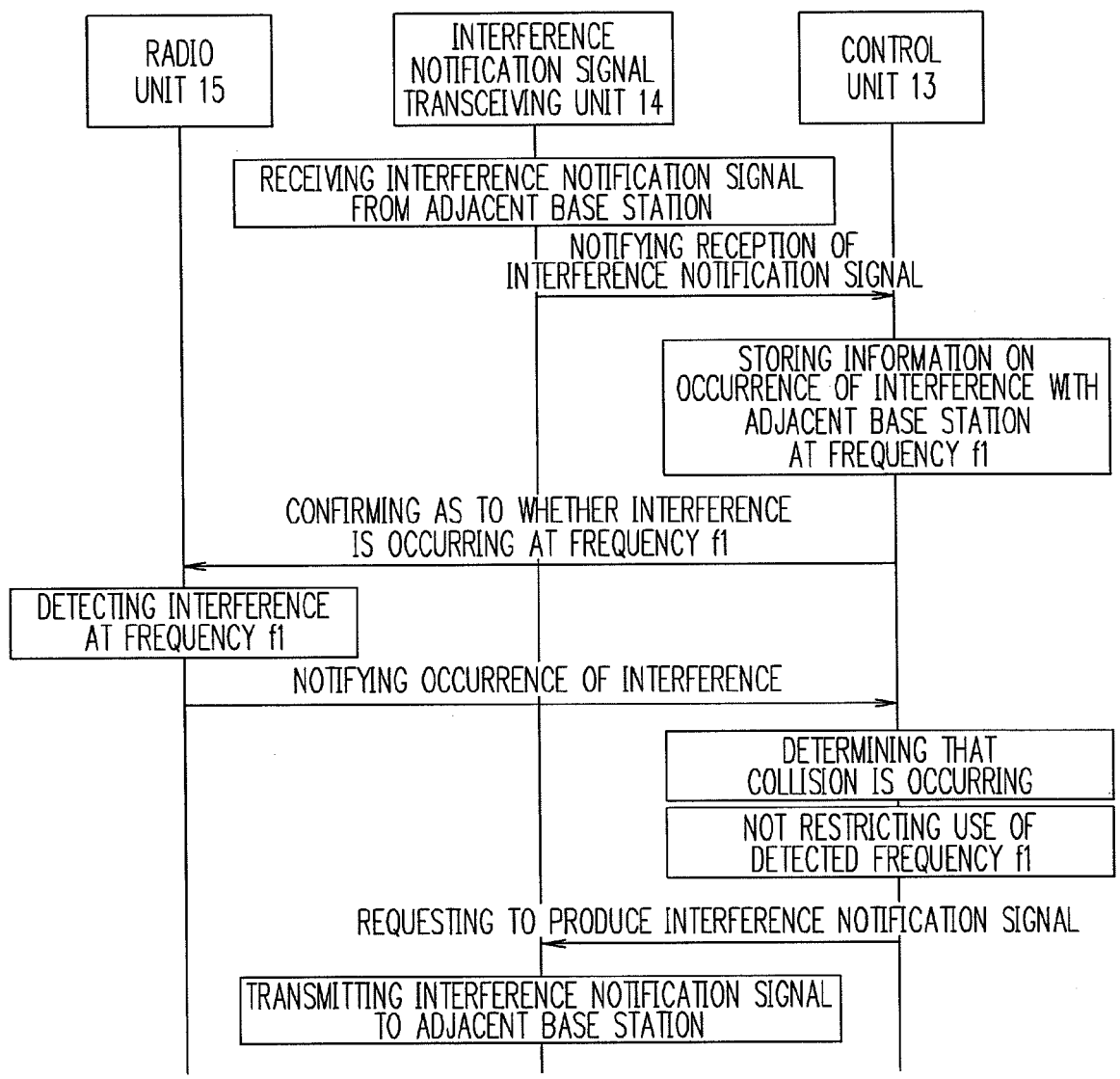

RADIO COMMUNICATION CONTROL DEVICE, RADIO COMMUNICATION CONTROL SYSTEM, RADIO COMMUNICATION CONTROL METHOD, RADIO COMMUNICATION CONTROL PROGRAM AND RECORDING MEDIUM

This application is based upon and claims the benefit of priority from Japanese patent application No. 2007-328466, filed on Dec. 20, 2007, the disclosure of which is incorporated herein in its entirety by reference.

BACKGROUND OF THE INVENTION

1. Field of the Invention

The present invention relates to a radio communication control device, a radio communication control system, a radio communication control method, a radio communication control program and a recording medium, which in particular, are capable of removing an interference source.

2. Description of Related Art

A W-CDMA (wide-band code division multiple access) system, a so-called third generation (3G) mobile communication system is providing high-speed communications through additional technologies such as a HSDPA (high-speed downlink packet access) technology. In an attempt to provide even faster communications, a new radio system called an LTE (Long Term Evolution) has been considered in a 3GPP (3rd Generation Partnership Project). With respect to the radio access system in the LTE, a SC-FDMA (single-carrier frequency division multiple access) scheme is adopted for uplink communications, whereas an OFDMA (orthogonal frequency division multiple access) scheme is adopted for downlink communications. The OFDMA is a digital modulation demodulation scheme by which multiple carrier waves (which are referred to as sub-carriers) are to be multiplexed using orthogonality of frequency. The features of the SC-FDMA resemble those of the OFDMA. What is different about the SC-FDMA from the OFDMA is that the carriers allocated to users are continuous in the SC-FDMA.

FIG. 7 is a diagram for explaining uplink radio resources (according to SC-FDMA technology) which are to be provided in the LTE system. As mentioned earlier, the SC-FDMA uses multiple carriers. These carriers correspond to the blocks present along the frequency axis as shown in FIG. 7. The radio resources are further divided along the time axis. In this way, blocks divided by frequency and time components are to be allocated to respective users. Blocks which are adjacent each other in frequency components can be allocated to a user. For example, at time t1, two blocks can be allocated to a user 3. The frequency components allocated in this case should be continuous as f1 and f2.

Japanese Patent Laid Open Publication No. 2003-018091, (cf. paragraphs 0002 to 0006) notes that interference will occur between adjacent base stations when they share the same frequency band in conducting modulation based on an OFDM (orthogonal frequency division multiplexing) system, and it further makes mention about conducting power control in order to resolve the interference problem between adjacent base stations and improve frequency utilization efficiency. Moreover, Japanese Patent Laid Open Publication No. 2004-159345, (cf. paragraphs 0002 to 0011) refers to a case of adjacent base stations allocating the same frequency resources to users.

For instance, in a case there is a user terminal a (4) under two base stations (base station 1 and base station 2), the base stations and the user terminal a (4) are under the condition of using the above-mentioned radio resource blocks allocation control and radio resource (see FIG. 8). As shown in FIG. 8, the user terminal a (4) is in a subordinate cell under the base station 1. On the other hand, the user terminal a (4) is also an uplink interference source for the base station 2. Furthermore, the user terminal a (4) is positioned outside a subordinate cell under the base station 2. Such relationship is identified as intercell interference occurring with respect to the base station 2. Here, as shown in FIG. 9, in a case when a user terminal b (5) is in a subordinate cell under the base station 2 which controls radio resource management (radio resource blocks allocation control), the user terminal a (4) uses higher transmission power than the user terminal b (5) considering possible propagation loss (or path loss) from the base station 1. Therefore, the interference to a signal of the user terminal b (5) will be brought to a level that can no longer be disregarded, whereby the base station 2 will need to inform the base station 1 that interference is occurring at frequency f1.

In this connection, document R1-073674 ("Overload Indicator handling for LTE" (3GPP), Nokia Siemens Networks, Nokia, internet source: URL: http://www.3gpp.org/ftp/Specs/html-info/TDocExMtg--R1-50--26036.htm) contributed to the 3GPP RAN1 Working Group indicates that introduction of an OI (overload indicator, also referred to as interference notification signal, in general) is being discussed in the 3GPP. The OI is a signal generated between base stations to indicate an occurrence of intercell interference. In a case described with reference to FIG. 9, the operation of the OI corresponds to the operation of the base station 2 informing the base station 1 about the occurrence of interference at frequency f1. Moreover, Japanese Patent Laid Open Publication No. 2005-065182, (cf. paragraphs 0011 to 0013) refers to a case of a base station detecting as to whether there is a different base station having a communication area that overlaps with its own communication area, and notifying the detected base station with the possibility of radio wave interference if there is any.

The OI contains frequency information where interference has been found. Based on this information, the notified base station is able to speculate that the user terminal using the designated frequency is the source of interference. The base station having received the OI will restrict radio resource allocation with respect to the user terminal of the interference source in order to let the user terminal use frequency other than the one designated, and thus reduce the interference with respect to the adjacent base station.

SUMMARY

In the LTE system, however, when the OI is generated in the above-described manner, there are possibilities that OI collision may occur. The occurrence of the OI collision indicates a situation in which a base station having transmitted an interference notification signal is receiving the same signal. FIG. 10 is a diagram for explaining the occurrence of the OI collision. The base station 1 is controlling the radio resource that the user terminal a (4) can use. Accordingly, the user terminal a (4) should be an interference source for the base station 2 and base station 3. In this case, therefore, the base station 2 and the base station 3 will notify the adjacent base stations that interference is occurring at frequency f1, by transmitting OIs to the adjacent base stations. In other words, the base station 2 will transmit the OIs to the base station 1 and the base station 3, whereas the base station 3 will transmit the OIs to the base station 1 and the base station 2. At this time, the OIs will collide in between the base station 2 and the base station 3.

When the OI collision occurs, what will be a problem is a case when the base station 2 (or the base station 3) has the user terminal b (5) which uses the same frequency f1 as the user terminal a (4) (see FIG. 11). As mentioned above, triggered by the OI, the base station restricts the radio resource available for use by the user terminal. Therefore, the base station 2 having received the OI from the base station 3 restricts the radio resource available for use by the user terminal b (5). However, the source of interference in this case is the user terminal a (4) which belongs to the subordinate cell under the base station 1. Accordingly, the user terminal b (5) comes to be restricted unnecessarily. As a result, the amount of uplink transmission data at the base station 2 will be decreased.

The present invention is provided in view of such circumstances, and an exemplary object of the present invention is to provide a radio communication control device, a radio communication control system, a radio communication control method, a radio communication control program and a recording medium, which are capable of conducting appropriate radio resource control in response to a received interference notification signal.

For the purpose of achieving such exemplary object, the present invention is to have the following features.

A radio communication control device according to the present invention, which controls allocation of radio resource for use by a mobile communication terminal in a radio communication system, includes: radio means for monitoring a communication status with the mobile communication terminal and detecting interference relating to first frequency information; transceiving means for transmitting a first interference notification signal containing the first frequency information and receiving a second interference notification signal containing second frequency information; and control means for restricting the radio resource in a case when the second interference notification signal is being received, wherein the control means does not restrict the radio resource in a case when the first frequency information and the second frequency information have a predetermined relation.

A radio communication control system according to the present invention includes: one or more mobile communication terminals; and one or more of the above-described radio communication control devices according to the present invention, which communicate with the mobile communication terminals.

A radio communication control method according to the present invention, which controls allocation of radio resource for use by a mobile communication terminal in a radio communication system, includes: monitoring a communication status with the mobile communication terminal and detecting interference relating to first frequency information; transmitting a first interference notification signal containing the first frequency information and receiving a second interference notification signal containing second frequency information; and restricting the radio resource in a case when the second interference notification signal is being received, wherein the radio resource is not restricted in a case when the first frequency information and the second frequency information have a predetermined relation.

A radio communication control program according to the present invention, which controls allocation of radio resource for use by a mobile communication terminal in a radio communication system, includes processes to be executed by a computer which include: a process of monitoring a communication status with the mobile communication terminal and detecting interference relating to first frequency information; a process of transmitting a first interference notification signal containing the first frequency information and receiving a second interference notification signal containing second frequency information; and a process of restricting the radio resource in a case when the second interference notification signal is being received, wherein the radio resource is not restricted in a case when the first frequency information and the second frequency information have a predetermined relation.

A computer-readable recording medium according to the present invention records the processes in the above-described radio communication control program according to the present invention.

BRIEF DESCRIPTION OF THE DRAWINGS

The objects and features of the present invention will become more apparent from the consideration of the following detailed description taken in conjunction with the accompanying drawings, in which:

FIG. 1 is a block configuration diagram of a base station 10 according to an exemplary embodiment of the present invention;

FIG. 2 is a diagram for explaining a state around the base station 10 according to the exemplary embodiment of the present invention;

FIG. 5 is a sequence diagram showing operation processing by respective components of the base station 10 according to another exemplary embodiment of the present invention;

EXEMPLARY EMBODIMENT

Figure 3:
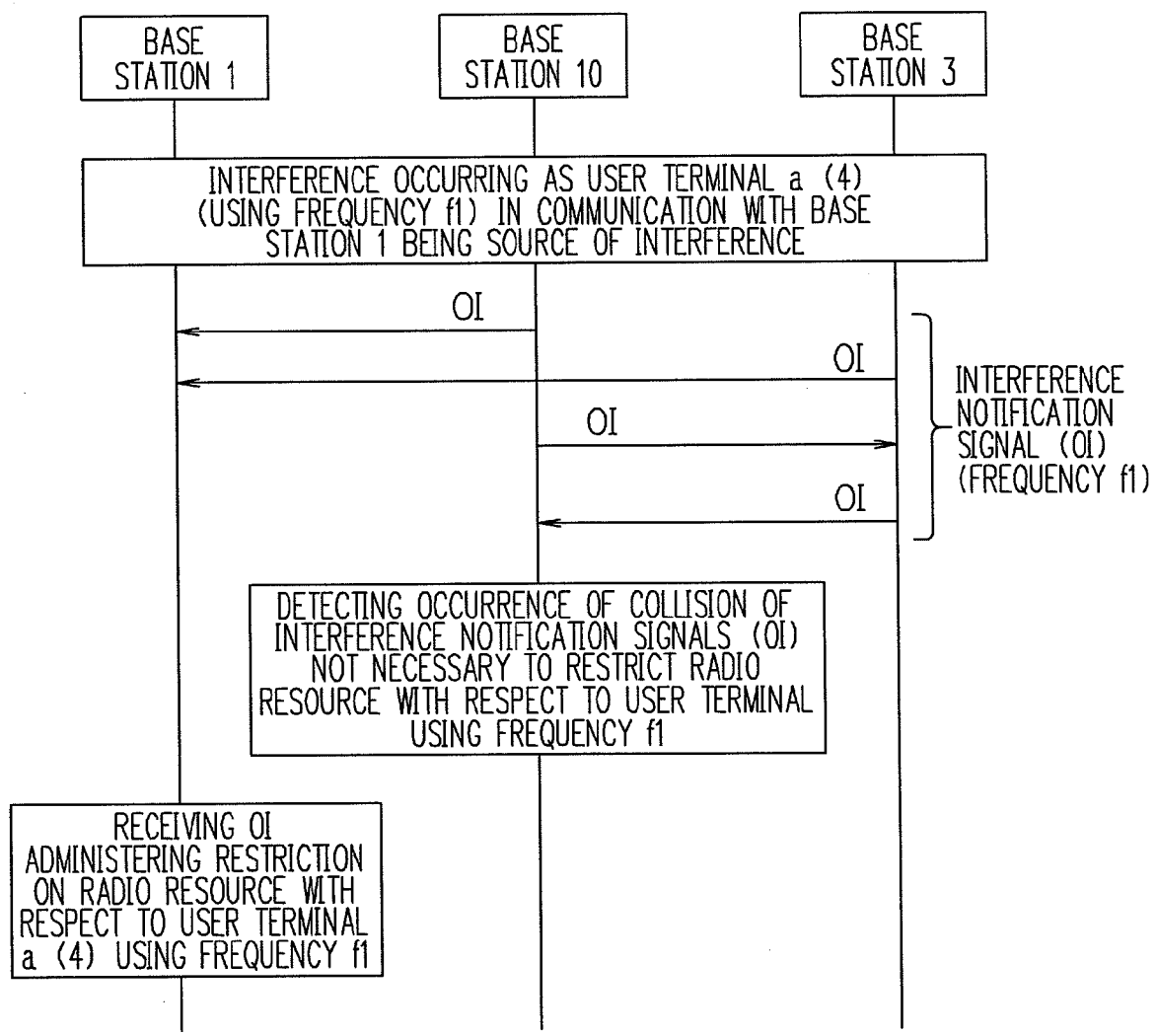
FIG. 3 is a sequence diagram showing operation processing by the base station 10 according to the exemplary embodiment of the present invention.

In the following, exemplary embodiments of the present invention will be described in detail with reference to the drawings. The exemplary embodiments described in the following have various limitations, which are technically favorable. However, the scope of the present invention is not to be limited to such exemplary embodiments unless it is particularly mentioned in the following description that the present invention should be limited accordingly.

Here, the term "user terminal" is a generic name for all kinds of terminals conducting radio communications including a cell-phone terminal, PHS, personal computer and the like. These terminals can also be called mobile communication terminals, in general. A base station can also be called a radio communication control device, in general. A radio communication control device is to control allocation of radio resource for use by the mobile communication terminal. A radio resource can also be called frequency (frequency band).

FIG. 1 is a block configuration diagram of a base station 10 according to an exemplary embodiment of the present invention. The base station 10 includes at least a control unit 13, an interference notification signal transceiving unit 14 and a radio unit 15. The radio unit 15 monitors a communication status with a mobile communication terminal and detects interference related to predetermined frequency information. The interference notification signal transceiving unit 14 transmits/receives an interference notification signal. When the interference notification signal is received by the control unit 13, the control unit 13 restricts a radio resource and eliminates the source of interference. The control unit 13 does not restrict the radio resource when the frequency information where the interference is detected by the radio unit 15 and the frequency information received by the interference notification signal transceiving unit 14 have a predetermined relation. Here, the "predetermined relation", for instance, includes a situation in which the frequency information is found as matched completely, and also a situation in which the frequency information is found as matched partially.

The situation where the frequency information is found as matched completely, for instance, may be a situation in which a frequency band where the interference is recognized through monitoring at the own base station is 1990 MHz to 1990.5 MHz while a frequency band indicated by the interference notification signal is the same frequency band 1990 MHz to 1990.5 MHz. In this case, even though the base station has received the interference notification signal, the matched frequency band 1990 MHz to 1990.5 MHz will not be subject to being restricted for frequency usage.

Meanwhile, the situation where the frequency information is found as matched partially, for instance, may be a situation in which a frequency band where the interference is recognized through monitoring at the own base station is 1990 MHz to 1990.5 MHz while a frequency band indicated by the interference notification signal is 1990 MHz to 1991 MHz. In this case, even though the base station has received the interference notification signal, the partially matched frequency band 1990 MHz to 1990.5 MHz will not be subject to being restricted for frequency usage. However, the own base station will restrict frequency usage with respect to the unmatched frequency band 1990.5 MHz to 1991 MHz.

Another case of the situation where the frequency information is found as matched partially, for instance, may be a situation in which a frequency band where the interference is recognized through monitoring at the own base station is 1990 MHz to 1991 MHz while a frequency band indicated by the interference notification signal is 1990 MHz to 1990.5 MHz. In this case, even though the base station has received the interference notification signal, the partially matched frequency band 1990 MHz to 1990.5 MHz will not be subject to being restricted for frequency usage. On the other hand, the own base station will transmit the interference notification signal to notify that the interference is occurring at the frequency band 1990 MHz to 1991 MHz.

The radio unit 15 includes a communication unit 20 and an interference detection unit 21. The communication unit 20 radio-communicates with a user terminal 12. In radio communications, the radio resource based on the radio resource allocation determined by the control unit 13 will be used. The interference detection unit 21 monitors an uplink receiving status to detect an occurrence of interference if there is any. It is possible to arrange such that the interference detection unit 21 not only monitors the uplink communications but also the down link communications to detect an occurrence of interference if there is any.

The interference notification signal transceiving unit 14 transmits/receives the interference notification signal to/from an adjacent base station 11.

The control unit 13 includes an interference notification signal transmission requesting unit 16, an interference frequency storing unit 17, an interference notification signal collision detecting unit 18, and a radio resource allocation determining unit 19. The interference notification signal transmission requesting unit 16 requests transmission of the interference notification signal in a case where the interference has occurred, and eliminates the source of interference. The interference frequency storing unit 17 stores the frequency information at which the interference detected by the interference detecting unit 21 is occurring. The interference notification signal collision detecting unit 18, in a case when the interference notification signal transceiving unit 14 has received the interference notification signal, detects a collision of the interference notification signals by determining as to whether the base station 10 has transmitted the interference notification signal. The radio resource allocation determining unit 19 determines the radio resource to be allocated to the user terminal 12, and restricts the radio resource allocation in a case when the interference notification signal transceiving unit 14 has received the interference notification signal from the adjacent base station. It is not necessary that the control unit 13 should include all of these functions, while it is also possible to provide the interference notification signal collision detecting unit 18, etc. as being arranged separately from the control unit 13.

At least one or more base stations which are adjacent to the base station 10 will be generally referred to as adjacent base stations 11. In FIG. 2, base stations 1 and 3 correspond to the adjacent base stations 11.

Now, operation processing in the radio communication control according to the exemplary embodiment of the present invention will be described. With the radio communication control according to the present embodiment, it is to be controlled such that unnecessary radio resource restriction will not be administered in a case when a collision of interference notification signals has occurred. A relation among the base station 10, the base station 1 and the base station 3 will be described with reference to FIG. 2. In the diagram, the base station 1 is in communication with a user terminal a (4). Frequency (to be considered as "f1") which the user terminal a (4) is using can be detected by the base station 1. This is because the base station 1 decides the radio resource to be allocated to the user terminal a (4). Therefore, the user terminal a (4) does not cause any interference with the base station 1.

On the other hand, the user terminal a (4) causes interference with the base station 10 and the base station 3 at frequency f1. Here, it is to be considered that this interference is significant to such a degree that it cannot be ignored for the user terminal 12 in communication with the base station 10. Then the base station 10 detects the occurrence of the interference at frequency f1.

After that, the base station 10 transmits the interference notification signals directed to the adjacent base stations. In this case, the base station 10 transmits the interference notification signals to the base station 1 and the base station 3. The interference notification signal contains information on the frequency ("f1" in the present exemplary embodiment) where the interference has occurred.

On the other hand, the base station 3, which is also being interfered with by the user terminal a (4) at frequency f1, transmits the interference notification signals directed to the adjacent base stations. In this case, the base station 3 transmits the interference notification signals to the base station 1 and the base station 10.

FIG. 3 is a sequence diagram showing the operation processing in the radio communication control according to the present embodiment. In the diagram, the base station 1 is in communication with the user terminal a (4). As mentioned earlier, the user terminal a (4) is causing the interference with the base station 10 and the base station 3 at frequency f1. The base stations 10 and 3 detect the occurrence of the interference at frequency f1.

After that, the base station 10 and the base station 3 start transmitting the interference notification signals (OIs). As mentioned above, since the interference notification signals are directed to the adjacent base stations, the base station 10 transmits the interference notification signals to the base station 1 and the base station 3, whereas the base station 3 transmits the interference notification signals to the base station 1 and the base station 10.

Then the base station 10 detects a collision of the interference notification signals. Detection of the interference notification signal collision will be described later.

In the case when the base station 10 detects a collision of the interference notification signals, it does not restrict the radio resource allocation with respect to the user terminal 12 which is using frequency f1. On the other hand, when the base station 10 does not detect a collision of the interface notification signals, it restricts the radio resource allocation with respect to the user terminal which is using frequency f1.

Figure 4:
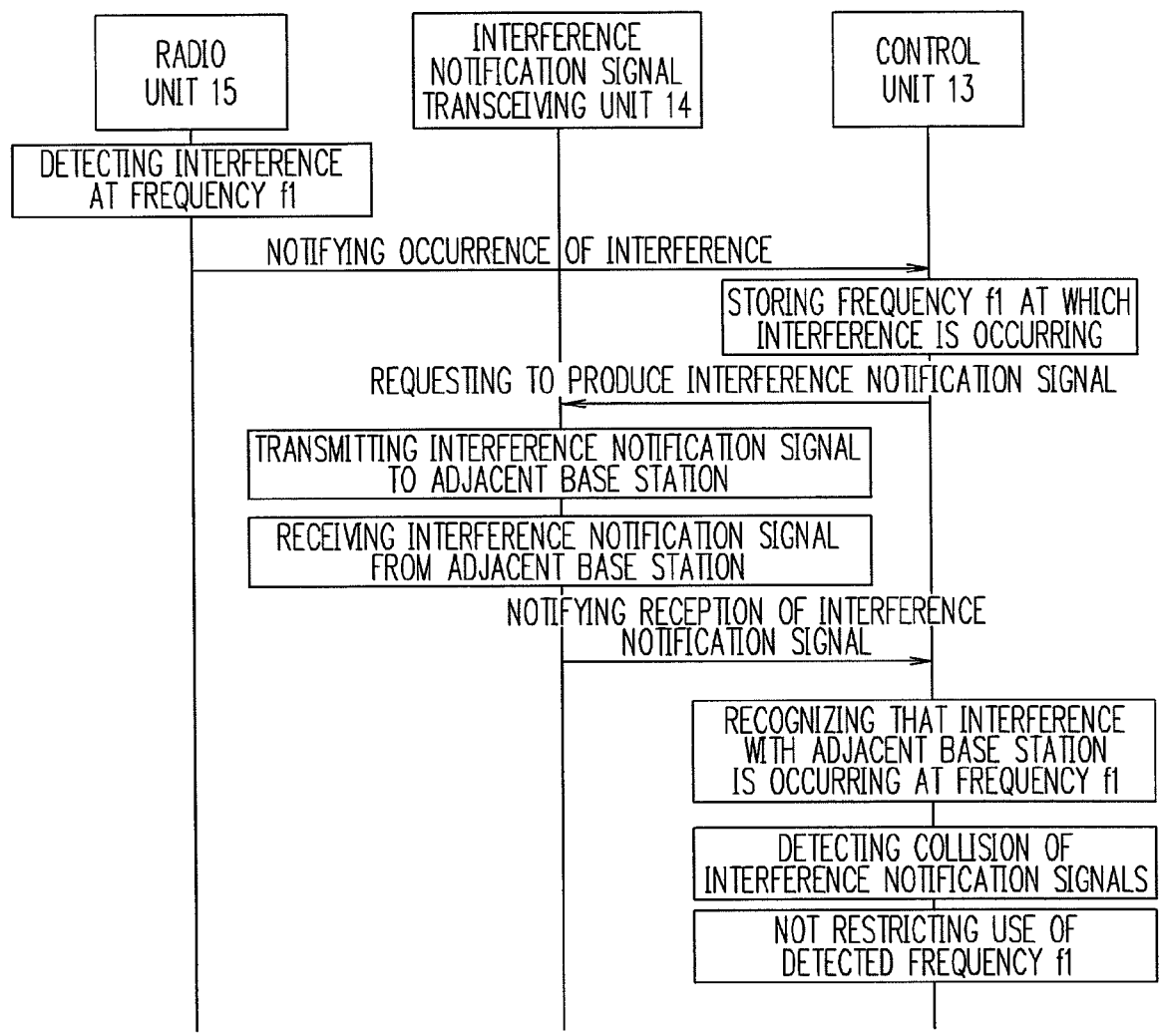
FIG. 4 is a sequence diagram showing operation processing by respective components of the base station 10 according to the exemplary embodiment of the present invention.

Now, the operation processing to be carried out inside the base station 10 will be described in detail. FIG. 4 is a sequence diagram showing the operation processing to be carried out inside the base station 10 according to the exemplary embodiment of the present invention. As shown in FIG. 1, the base station 10 includes the control unit 13, the interference notification signal transceiving unit 14 and the radio unit 15.

With respect to the exemplary embodiment, description will be given referring to a case in which interference is occurring at frequency f1, as an example. The radio unit 15 is capable of detecting an occurrence of interference at frequency f1 since it is conducting interference detection at any time.

Then the radio unit 15 informs the control unit 13 about the occurrence of the interference.

The control unit 13 stores information on frequency f1 where the interference has occurred. The control unit 13 also requests the interference notification signal transceiving unit 14 to produce interference notification signals. Then the interference notification signal transceiving unit 14 transmits the interference notification signals to the adjacent base stations. In this case, the adjacent base stations corresponds to the base station 1 and the base station 3 in FIG. 3.

If the interference with the adjacent base station is also occurring (in the exemplary embodiment, the interference with the base station 3 is also occurring), the interference notification signal transceiving unit 14 receives the interference notification signal from the adjacent base station. Then the interference notification signal transceiving unit 14 informs the control unit 13 about receiving the interference notification signal from the adjacent base station.

Through the notification from the interference notification signal transceiving unit 14, the control unit 13 recognizes that the interference with the adjacent base station is occurring at frequency f1.

The control unit 13 compares the stored information on the interference (interference at frequency f1) detected by its own base station with the information on the interference (interference at frequency f1) obtained from the adjacent base station, and determines as to whether a collision of the interference notification signals has occurred.

Triggered by the received interference notification signal, the control unit 13 restricts the radio resource usage with respect to the user terminal. In a case when an occurrence of a collision of the interference notification signals is detected, the control unit 13 does not restrict the radio resource usage with respect to the user terminal.

According to the exemplary embodiment, a collision of the interference notification signals is detected by determining as to whether the subject frequencies of the transmitted interference notification signal and the received interference notification signal coincide. Therefore, if a collision of the interference notification signals has actually occurred, it is possible to prevent unnecessary restriction on the radio resource usage. In other words, the exemplary embodiment is characterized by restricting the radio resource for use by the mobile communication terminal that uses the frequency where the interference is occurring, only when the interference notification signal is received from the adjacent base stations and a collision of the interference signals is not detected.

Moreover, the exemplary embodiment also has an effect of increasing the amount of uplink transmission per base station, because of its ability to avoid unnecessary restriction on the radio resource usage.

Now, detection of an interference notification signal collision, according to another exemplary embodiment of the present invention will be described. The exemplary embodiment, in particular, is about a case of controlling in a case when a base station receives an interference notification signal from an adjacent base station prior to detecting interference with the own base station.

FIG. 5 is a sequence diagram showing the operation processing to be carried out inside the base station 10. The interference notification signal transceiving unit 14, upon receiving an interference notification signal from the adjacent base station, informs the control unit 13 about the reception of the interference notification signal.

The control unit 13 stores information about an occurrence of interference with the adjacent base station at frequency f1. The interference notification signal contains information of the frequency at which the interference has occurred. The exemplary embodiment will refer to a case in which the interference is occurring at frequency f1, as an example.

The control unit 13 confirms with the radio unit 15 as to whether interference with its own base station is occurring at frequency f1. The radio unit 15 determines as to whether the interference is occurring, and reports the result to the control unit 13. The exemplary embodiment will refer to a case in which interference with the own base station (base station 10) is occurring at frequency f1, as an example.

In a case when the control unit 13 is informed by the radio unit 15 that the interference with its own base station is occurring at frequency f1, the control unit 13 determines that a collision of the interference notification signals is occurring. Therefore, even though the interference notification signal is being received, the control unit 13 does not restrict the use of corresponding frequency f1 with respect to the user terminal which is in communication with its own base station.

Furthermore, since the interference with its own base station (base station 10) is occurring, the control unit 13 requests the interference notification signal transceiving unit 14 to produce interference notification signals. Then the interference notification signal transceiving unit 14 transmits the interference notification signals to the adjacent base stations.

According to the exemplary embodiment, on the assumption that an interference notification signal from the adjacent base station is received prior to detecting interference with the own base station, the control unit 13 determines as to whether interference with its own base station is occurring at the timing when it receives the interference notification signal. Therefore, according to the exemplary embodiment, it is possible to stably detect a collision of interference notification signals regardless of the timing at which the interference notification signal is received.

Figure 6:
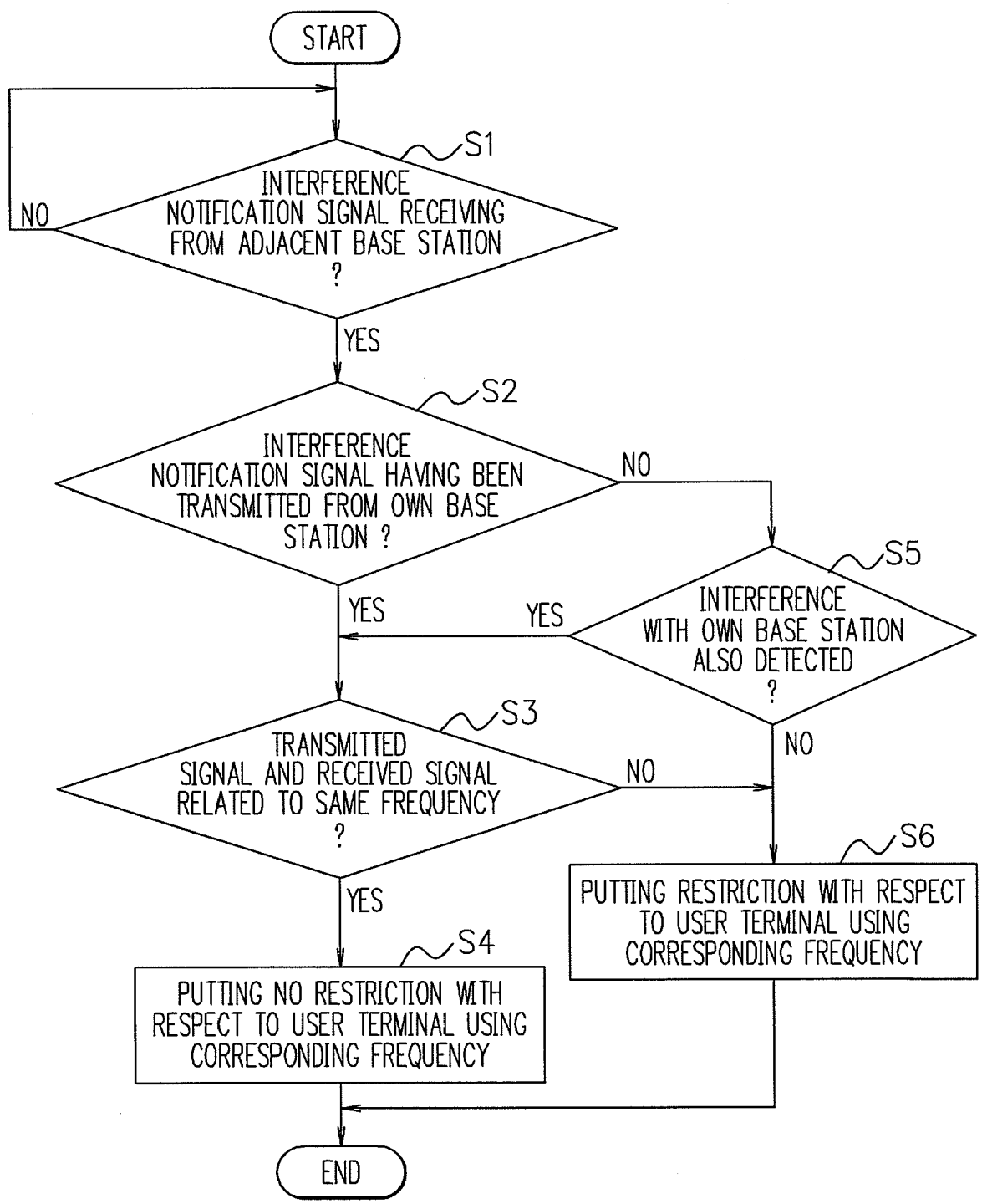
FIG. 6 is a flow chart showing operation processing by the base station 10 according to still another exemplary embodiment of the present invention.
Figure 7:
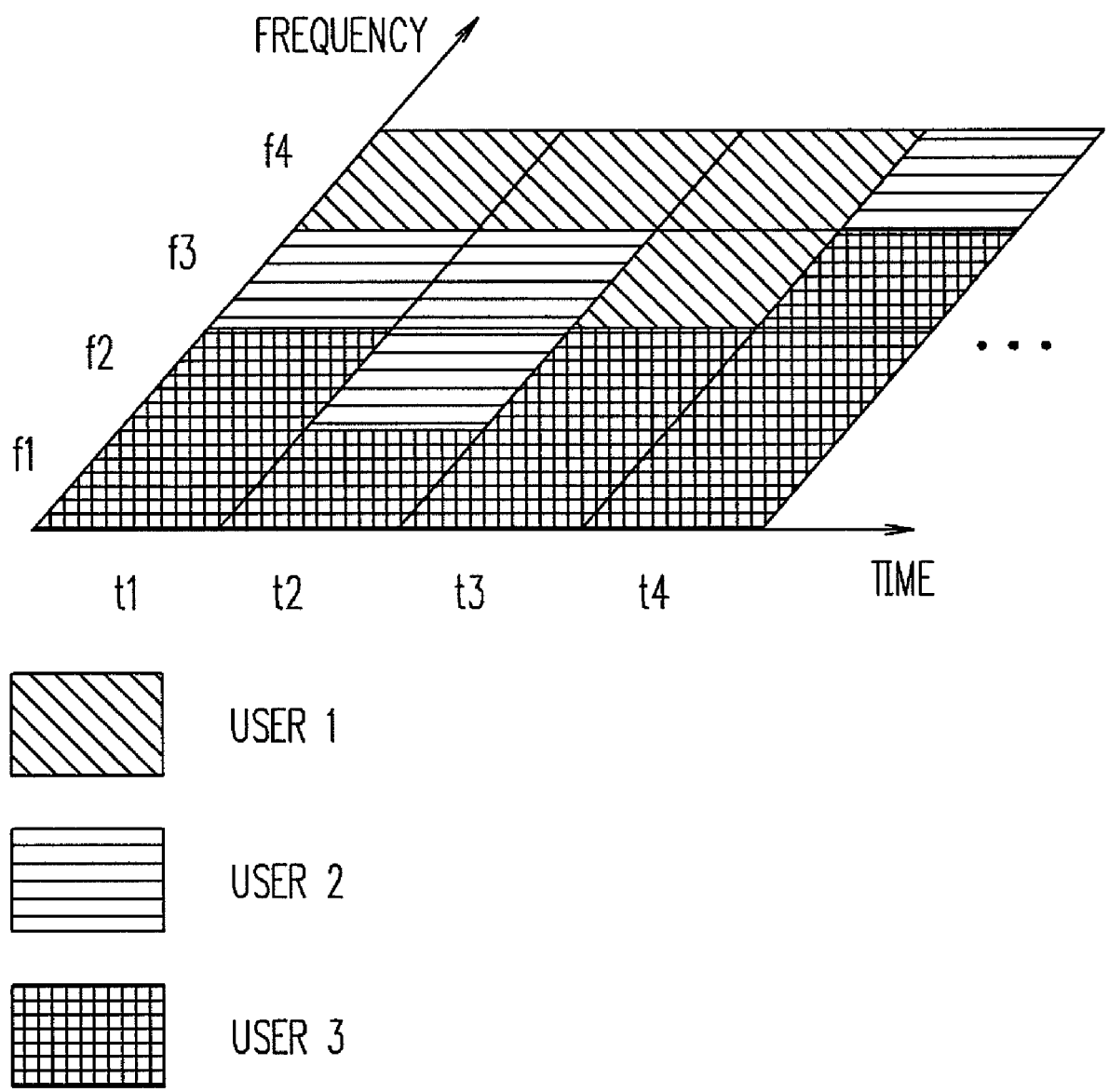
FIG. 7 is a diagram for explaining uplink radio resource (according to SC-FDMA technology) provided in the LTE system.
Figure 8:
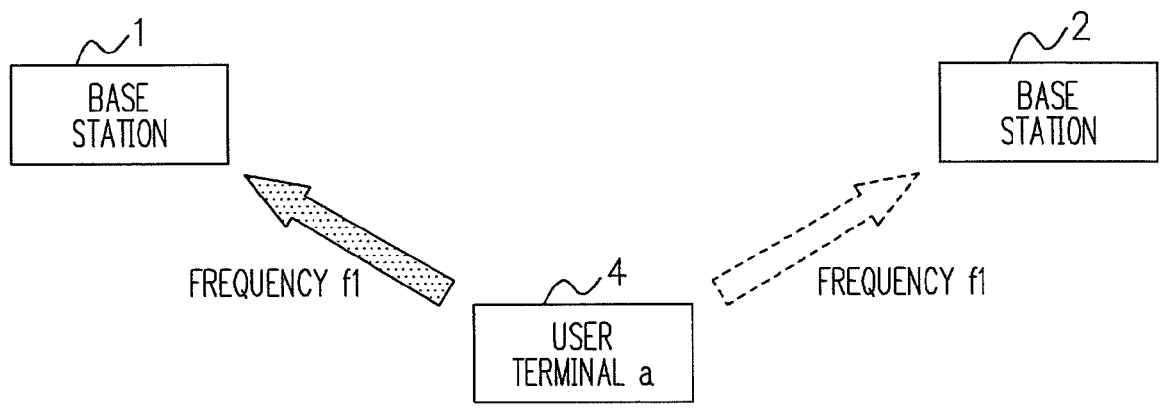
FIG. 8 is a diagram for explaining intercell interference in the LTE system.
Figure 9:
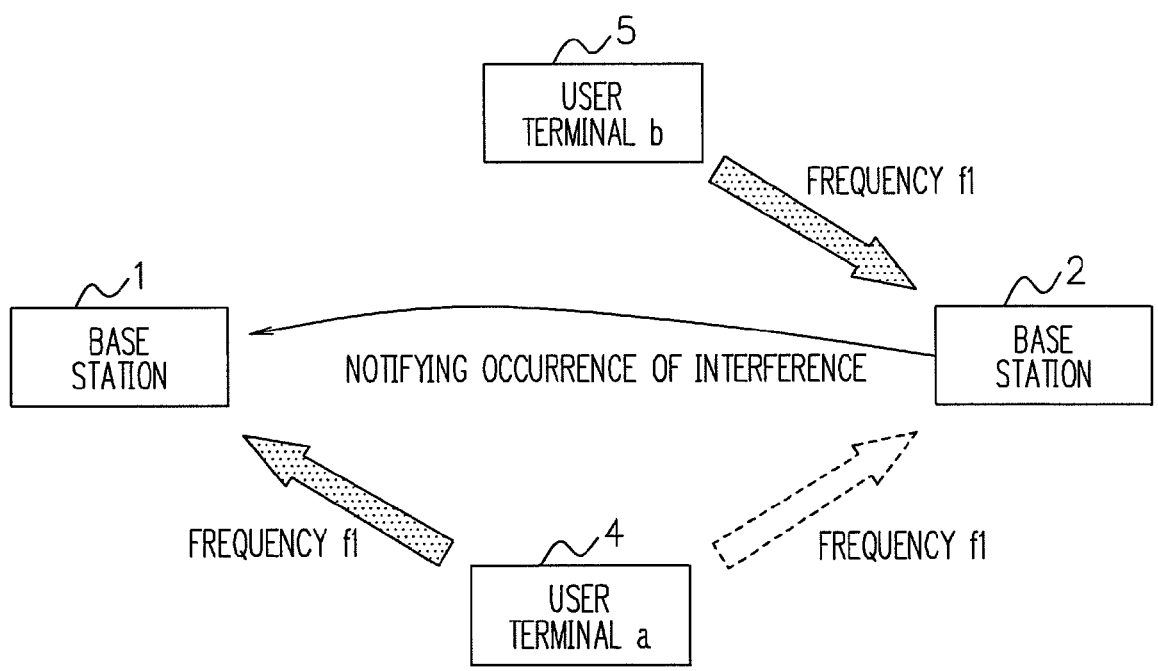
FIG. 9 is a diagram for explaining intercell interference in the LTE system.
Figure 10:
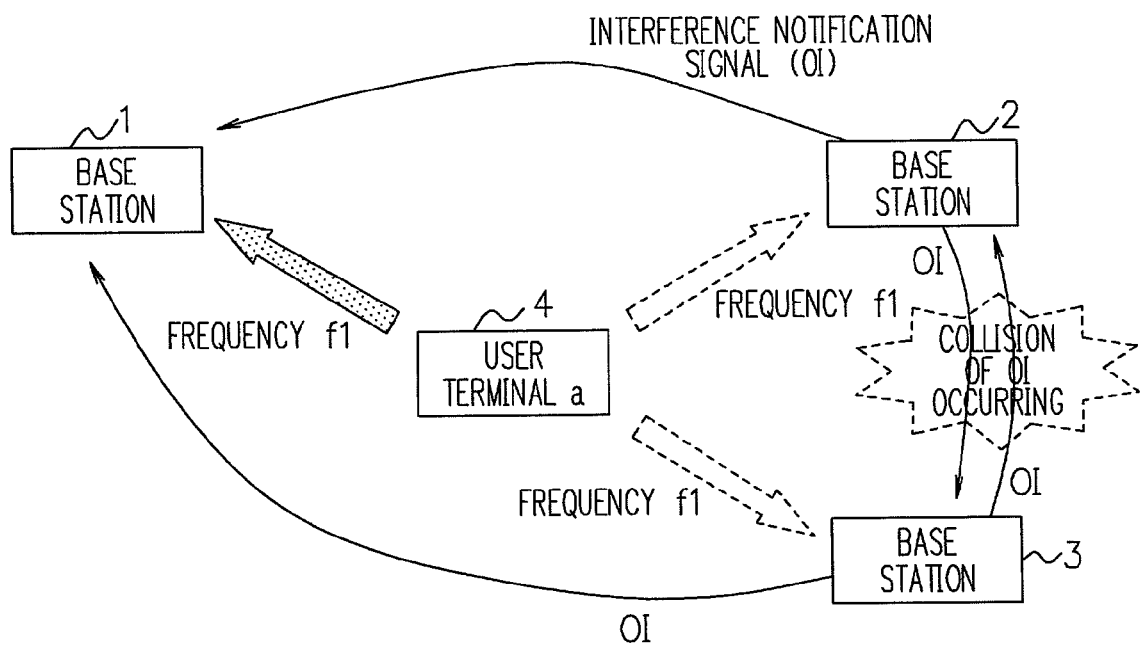
FIG. 10 is a diagram for explaining an occurrence of an OI collision.
Figure 11:
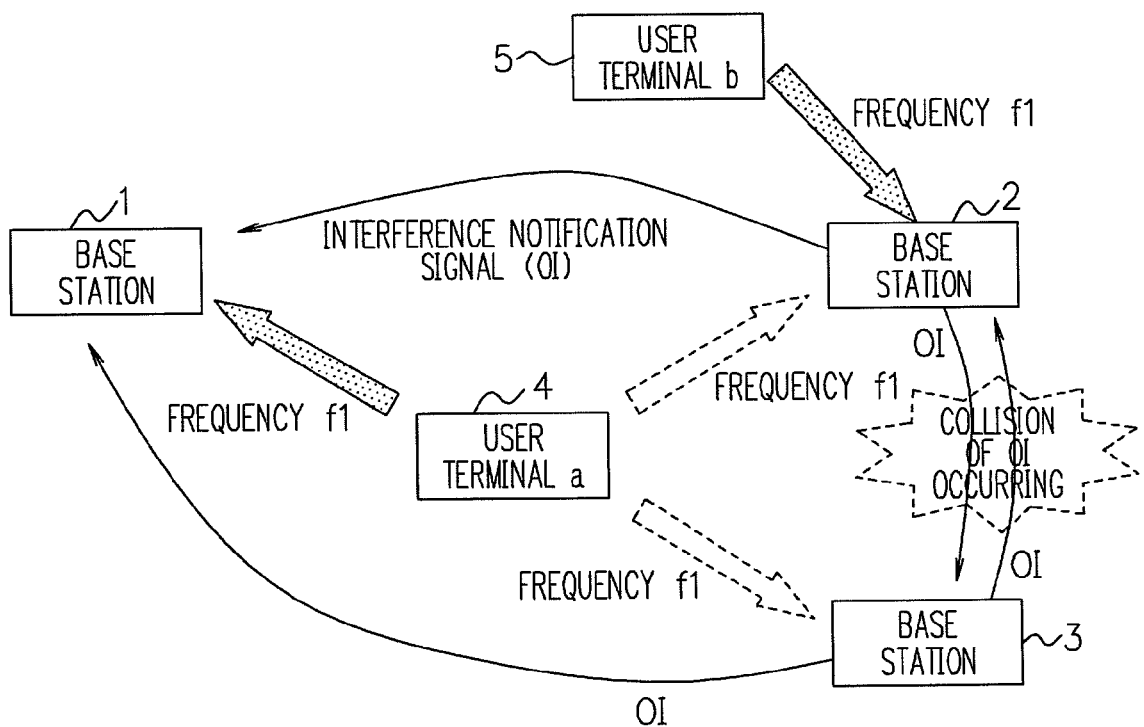
FIG. 11 is a diagram for explaining an occurrence of an OI collision.

Moreover, as to another possible embodiment, an exemplary embodiment which can meet both of the above-described exemplary embodiments (see FIG. 4 and FIG. 5) can be considered. FIG. 6 is a flow chart showing a case in which the control unit 13 provided in the base station 10 carries out the operation processing corresponding to the above-described exemplary embodiments (FIG. 4 and FIG. 5).

When the control unit 13 receives an interference notification signal from the adjacent base station (step S1/YES), the control unit 13 confirms as to whether an interference notification signal has been transmitted from its own base station (step S2). In a case when the interference notification signal has been transmitted (step S2/YES), the control unit 13 confirms as to whether the transmitted interference notification signal and the received interference notification signal are based on the interference at the same frequency (step S3). If the transmitted and the received interference notification signals indicate interference at the same frequency (step S3/YES), it means that a collision of the interference notification signals is occurring. Therefore, the control unit 13 does not restrict the radio resource usage with respect to the user terminal which is in the subordinate cell under the base station of its own and which is using the corresponding frequency (step S4). On the other hand, if the transmitted and the received interference notification signals do not indicate the interference at the same frequency (step S3/NO), it means that a collision of the interference notification signals is not occurring. Therefore, the control unit 13 restricts the radio resource usage with respect to the user terminal which is using the corresponding frequency (step S6).

Furthermore, if it is determined that the interference notification signal has not been transmitted from its own base station (step S2/NO), the control unit 13 confirms as to whether interference with its own base station is occurring or not (step S5). If the interference with its own base station is not occurring (step S5/NO), the control unit 13 restricts the radio resource usage with respect to the user terminal which is using the corresponding frequency based on the interference notification signal (step S6).

According to the exemplary embodiment, in the case when the interference notification signal is received from the adjacent base station, the control unit confirms as to whether the interference notification signal has already been transmitted from the own base station. And if the interference notification signal has not been transmitted, the control unit confirms as to whether the interference with the own base station is occurring or not. Therefore, according to the exemplary embodiment, it is possible to stably detect a collision of interference notification signals regardless of the timing at which the interference notification signal is received.

Moreover, as to still another embodiment, an exemplary embodiment in which a notification unit (not shown) is provided can be considered. This notification unit, in a case when the interference notification signal collision detecting unit 18 detects a collision of interference notification signals, notifies the adjacent base station 11, which has transmitted the interference notification signal in the collision, with the occurrence of the collision. Therefore, even if the adjacent base station is not provided with the interference notification signal collision detecting unit, it will be able to recognize the occurrence of the collision, by which it will be able to avoid unnecessary restriction of the radio resource usage with respect to the user terminal. Furthermore, considering possible re-transmission of the interference notification signal in a case when the source of interference is eliminated, notifying the occurrence of the collision will be effective in preventing the interference notification signal from being received again from the adjacent base station.

It is possible that the radio communications in each of the exemplary embodiments should be provided by the radio communication system of the above-mentioned LTE system. According to the present invention, when interference notification signals collide between LTE base stations, the interference notification signal will be disregarded, and no restriction on the radio resource allocation will be done. Therefore, it will be possible to improve procedures for decreasing inter-cell interferences (restricting the radio resource allocation) in the LTE system.

A program for a CPU to execute the processes shown in each of the sequence diagrams and the flow charts configures a program according to the present invention. With respect to a recording medium for recording such program, a semiconductor memory unit or optical and/or magnetic memory unit, etc. can be used. By using such program and recording medium in a system, etc. having a different configuration from each of the above-described exemplary embodiments, and letting the program be executed by the CPU in that system, etc., it is possible to achieve substantially the same effects as in the case of the present invention.

Although the present invention has been described based on the exemplary embodiments, the present invention is not to be limited to the above-described exemplary embodiments while various changes may be made without departing from the scope of the invention.

What is claimed is:

1. A radio communication control device, which controls allocation of radio resource for use by a mobile communication terminal in a radio communication system, comprising:
   a radio unit which monitors a communication status with the mobile communication terminal and detects interference relating to first frequency information;
   a transceiving unit which transmits a first interference notification signal containing the first frequency information and receives a second interference notification signal containing second frequency information; and
   a control unit which restricts the radio resource in a case when the second interference notification signal is being received,
   wherein the control unit does not restrict the radio resource in a case when the first frequency information and the second frequency information have a predetermined relation;
   wherein the radio unit monitors an uplink receiving status, and the control unit includes:
   a transmission requesting unit which requests transmission of the first interference notification signal in the case when the interference is detected;
   a storing unit which stores the first frequency information at which the interference is occurring; and
   a detecting unit which, in the case when the transceiving unit receives the second interference notification signal, obtains the second frequency information contained in the second interference notification signal, confirms as to whether a frequency of the second frequency information contained in the second interference notification signal and a frequency of the first frequency information stored in the storing unit coincide, and detects as to whether a collision of the interference notification signals has occurred, wherein the control unit, in the case when the second interference notification signal is received and the collision is not detected, restricts the radio resource allocation of the mobile communication terminal which is using the frequency at which the interference is occurring.

2. The radio communication control device according to claim 1, wherein the detecting unit, in the case when the second interference notification signal is received, confirms as to whether the transceiving unit has already transmitted the first interference notification signal, and in the case when the first interference notification signal has already been transmitted, confirms as to whether the frequency of the first frequency information stored in the storing unit and the frequency of the second frequency information contained in the second interference notification signal coincide and detects an occurrence of a collision of the interference notification signals.

3. The radio communication control device according to claims 1, wherein the detecting unit, in the case when the second interference notification signal is received, confirms as to whether the transceiving unit has already transmitted the first interference notification signal, and in the case when the first interference notification signal has not been transmitted, confirms as to whether the interference can be detected by the radio unit, and in the case when the interference is detected, confirms as to whether a frequency of the second frequency information contained in the second interference notification signal and the frequency at which the interference is detected coincide and detects an occurrence of a collision of the interference notification signals.

4. The radio communication control device according to claim 1, wherein the transceiving unit transmits/receives the interference notification signal to/from another adjacent radio communication control device.

5. The radio communication control device according to claim 1, wherein the radio unit radio-communicates based on a radio access system of the LTE (Long Term Evolution) system, and the control unit allocates the radio resource divided along a frequency axis and a time axis.

* * * * *